Jan. 15, 1929.
F. ALBERT
1,699,420
SIGNAL DEVICE FOR VEHICLES
Filed Aug. 5, 1926
2 Sheets-Sheet 1
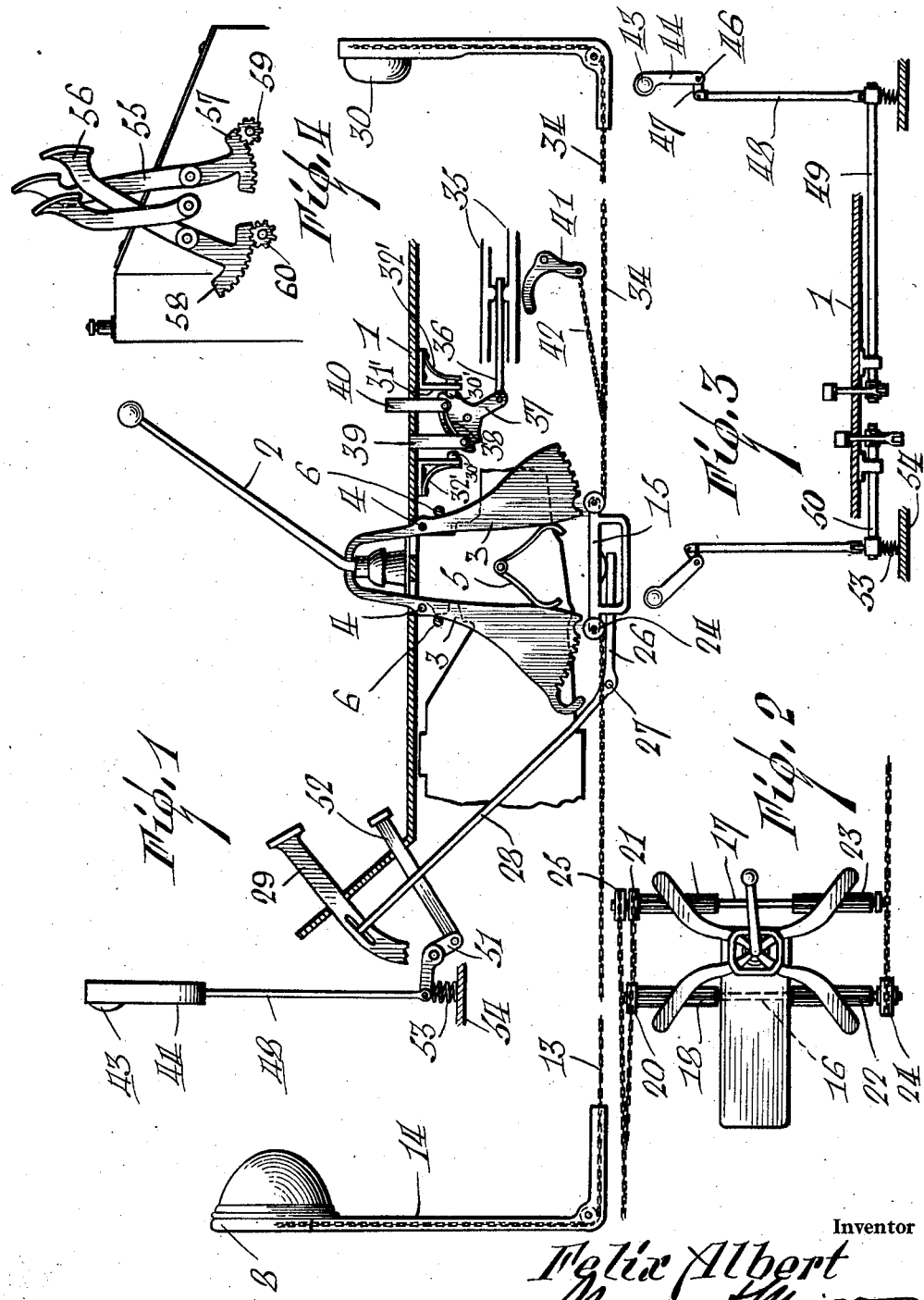
Inventor
*Felix Albert*
By *Marion & Marion*
Attorneys

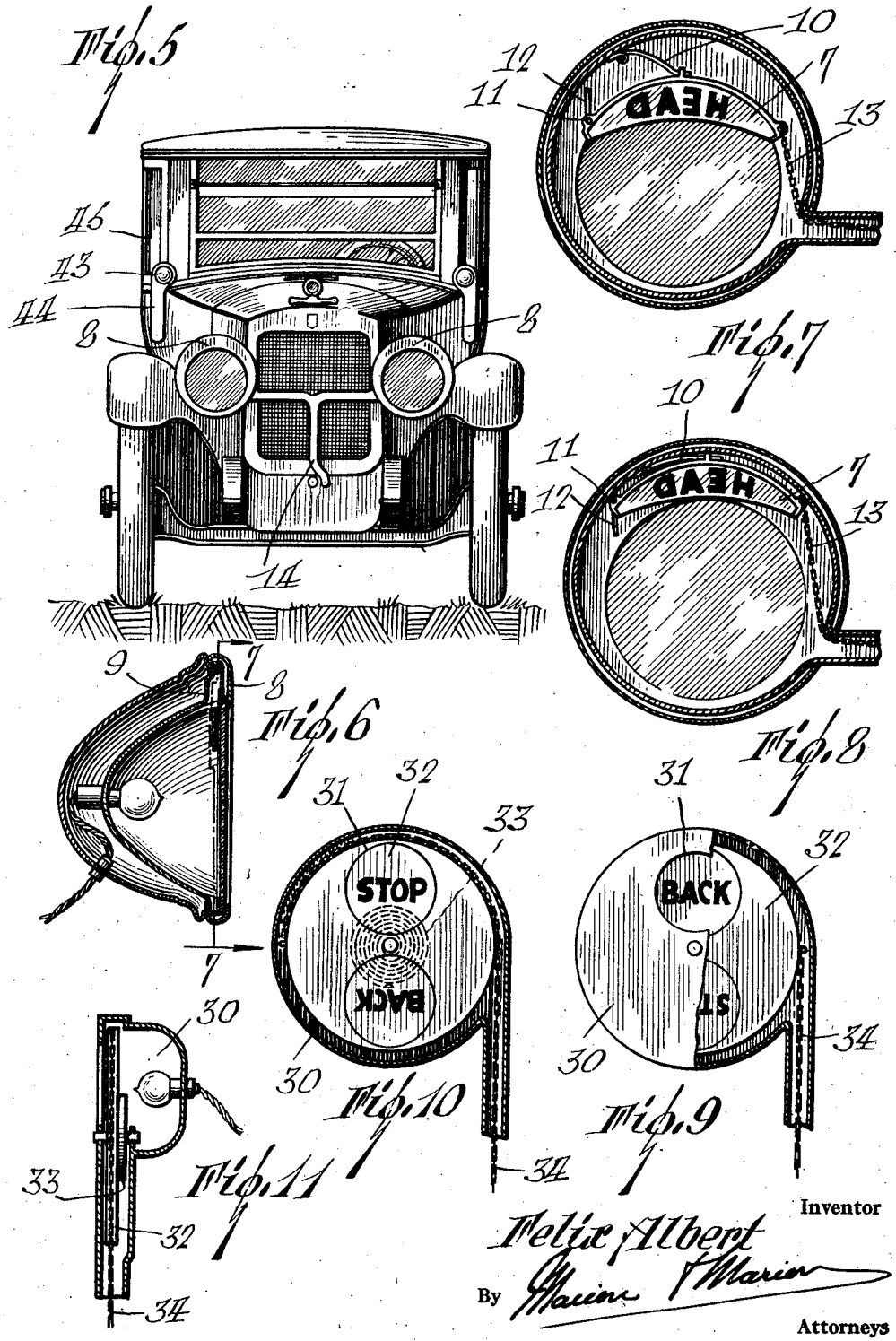

Patented Jan. 15, 1929.

1,699,420

UNITED STATES PATENT OFFICE.

FELIX ALBERT, OF COLLIN, NEW BRUNSWICK, CANADA.

SIGNAL DEVICE FOR VEHICLES.

Application filed August 5, 1926. Serial No. 127,208.

The present invention pertains to a novel signal device for vehicles designed particularly for application to automobiles, trucks and the like.

The principal object of the invention is the provision of signalling means disposed in the head lights and adapted for automatic actuation resulting from adjustment of the gear shifting lever. This object is accomplished, more specifically, by pivoting a series of racks adjacent the gear shifting lever in such a manner that a different rack is swung on its pivot at each adjustment of the lever. Transparent signal plates, normally concealed within the head lights, are moved into display position by means of their connections to pinions which are brought into engagement with the above mentioned racks. The signalling device in the tail light consists of a disc bearing the words "Stop" and "Back", the former being normally displayed through an apertured disc covering the light. When the gear shifting lever is brought into neutral position, the tail light may be illuminated whereupon the word "stop" is rendered prominent. When the gear shifting lever is moved into reverse position, the disc turns about its centre and brings the word "back" into view.

The invention is fully disclosed in the following description and in the accompanying drawings in which;

Figure 1 is a longitudinal section of an automobile showing in elevation an apparatus installed according to the invention;

Figure 2 is a detail plan view thereof;

Figure 3 is a detail transverse vertical section of an automobile showing in elevation the device of the invention;

Figure 4 is an interior fragmentary elevation of the device of the invention applied to an automobile of the Ford type;

Figure 5 is a front elevation of the automobile equipped with the invention;

Figure 6 is a longitudinal section of one of the head lights modified according to the invention;

Figure 7 is a section on the line 7—7 of Figure 6, showing the indicator in view;

Figure 8 is a section similar to Figure 7 showing the indicator concealed;

Figure 9 is an elevation of the tail light, part of the outer plate being broken away;

Figure 10 is a vertical section of the tail light; and

Figure 11 is a vertical section of the tail light at right angles to Figure 10.

Reference to these views will now be made by use of like characters which are employed to designate corresponding parts throughout.

In Figure 1 is illustrated the floor 1 of an automobile in which is mounted the usual gear shifting lever 2. Around this lever are mounted four racks 3 pivoted beneath the floor as at 4 and disposed partly above the floor in engagement with the lower end of the lever. Opposed racks are normally spaced at their lower ends by means of springs 5. A frame 6 surrounds the racks in a plane slightly beneath the floor 1 in order to prevent too wide divergence of these members.

Each of the head lights is provided with a transparent signal plate 7 on which is depicted a direction corresponding to the adjustment of the lever 2. The plate is adapted to be concealed between the outer frame 8 and the reflector flange 9 of the lamp as shown in detail in Figure 6. A spring 10 secured to the plate and to a fixed part of the lamp normally tends to raise the plate into a concealed position. One end of the plate carries a pin 11 slidable in a slot 12 cut in the flange 9, while a chain 13 is connected to the other end. A branched tubular member 14 extends from the two head lights to a point beneath the radiator of the automobile as illustrated in Figures 1 and 5.

Beneath the racks 3 is mounted a bearing frame 15 in which are journaled two shafts 16 and 17. These carry pinions 18 and 19 respectively which are further formed with pulleys 20 and 21 respectively. The shafts 16 and 17 have internal shafts (not shown) carrying pinions 22 and 23. These internal shafts are extended and provided with pulleys 24 and 25 as shown in Figure 2.

The chains 13 extending from the head lights are connected to the pinions 20, 21 and 25. The bottom of the frame 15 is engaged by one arm 26 of a bell crank lever pivoted to the body of the automobile as at 27, and the other arm 28 of this lever is connected to the clutch pedal 29. When the pedal is depressed, prior to shifting gears, the frame 15 is raised in order to bring the several pinions into mesh with the respective gears. As the lever 2 is actuated, one of the racks 3 is moved whereby the corresponding pinion is rotated, and a chain 13 wound around the associated pulley in order to bring the corresponding indicator 7 behind the lens of the head light. The indicator is thus illuminated to show to an approaching driver the movement to be taken by the vehicle under consideration.

At the rear of the vehicle is mounted a tail light 30 having an aperture 31 formed in the exposed part thereof. Behind this aperture is rotatably mounted a disc 32 on which are depicted the words "Back" and "Stop". These words are adapted to aline separately with the aperture 31. The disc 32 is engaged by a coil spring 33 whereby the stop signal is normally exposed through the opening 31 and rendered visible when the tail lamp is illuminated. A chain 34 is connected to the disc and also to the pulley 24 which is turned when the lever 2 is shifted into reverse position at which time the word "back" is brought into the aperture 31 as shown in Figure 9.

Beneath the floor 1 of the automobile is disposed a pair of switch contacts 35 adapted to supply current to the tail light 30 and normally separated by an insulating strip 36. The strip is connected at one end to a finger 37 pivoted to the vehicle and having a slot 38 into which are connected the lower ends of pedals 39 and 40 mounted in the floor 1. The depression of one pedal or the other serves to withdraw the strip 36 from between the contacts 35 or to insert the strip between them. The pedal 59 is normally depressed by a slidable pin 30' mounted in a bracket 31' and pressed against the finger 37 by a spring 32'. A bell crank lever 41 is pivoted beneath the lower contact 35 and adapted to lift it into engagement with the upper member. A chain 42 connects the member 41 to the chain 34, and when the latter is wound on the pulley 24 the switch contacts are brought into actual engagement, provided, however, that the strip 36 is previously removed in the manner already indicated.

The invention further includes a pair of side lights 43 mounted in arms 44 which are pivoted to the sides of the automobile body 45 as shown in Figure 5. To the pivot point 46 of each arm is secured a strip 47 having connected thereto a depending link 48. Shafts 49 and 50 are connected to the lower ends of the links and extended inwardly beneath the floor 1 as shown in Figure 3. These shafts further carry links 51 to which are connected pedals 52 passed through the floor of the vehicle. The links 48 are normally drawn down, to hold the arms 44 vertical, by springs 53 joining the links to a sub-floor 54. Spring pedals 51 are slidably mounted in the floor and normally moved upwardly by springs 52 bearing against shoulders 53 and against a sub-floor member 54. When the vehicle is about to make a turn, a corresponding pedal 52 is depressed whereby the arm 44 at the same side is swung outwardly as shown in Figure 3.

In Figure 4 is shown the head light indicator apparatus modified for an automobile of the Ford type. The brake pedal 55 and reverse pedal 56 are formed at their lower ends with racks 57 and 58 respectively. These are in engagement with pinions 59 and 60 respectively which correspond to the members 18, 19, 22 and 23 of the previous embodiment. The movement of the pedals 55 and 56 is transmitted to the pinions and thence to the signalling devices by the means already described.

While a specific embodiment of the invention has been illustrated and described, it is to be understood that various alterations in the details of construction may be made without departing from the spirit of the invention as indicated by the appended claims.

Having thus fully described the invention, what I claim as new and desire to protect by Letters Patent, is:

1. A signal control apparatus for vehicles having gear-shifting means, comprising signal operating racks associated with said gear-shifting means and movable thereby, a bearing frame movably mounted beneath said racks, pinions journaled in said frame, means for raising the frame to bring the pinions into engagement with the racks, pulleys connected to said pinions, and flexible connections between said pulleys and a suitable signaling device.

2. A signal control system for motor-vehicles having gear-shifting means, comprising signal-operating racks pivotally mounted adjacent the gear-shifting means, and operable thereby, suitable signal devices mounted for convenient exterior display, a bearing frame movably mounted beneath said racks, pinions journaled in said frame, a bell crank lever journaled in said vehicle, a clutch lever mounted in the vehicle and having one end connected to said bell crank lever the other end thereof engaging the lower part of the frame pulleys connected to said pinions, and flexible connections between said signaling device and pulleys.

3. In a signal control apparatus, for motor vehicles having gear shifting means, of racks associated with the said gear-shifting means and operable thereby, signal apparatus mounted for outside display, a bearing frame mounted near the racks, pinions journaled in said frame and engageable by the racks, a clutch lever mounted in the vehicle and adapted to engage the lower part of the bearing frame thereby engaging the racks and pinions, and flexible connections between said signal apparatus and the aforesaid pulleys.

In witness whereof I have hereunto set my hand.

FELIX ALBERT.